US008616972B2

(12) United States Patent
Vallejo et al.

(10) Patent No.: US 8,616,972 B2
(45) Date of Patent: *Dec. 31, 2013

(54) METHOD FOR INTERACTING A DISPLAY WITH MECHANICAL REELS

(75) Inventors: John Vallejo, Henderson, NV (US); Micheal L. Shackelford, Henderson, NV (US); Christopher Paul Noll, Las Vegas, NV (US); Christopher Ray England, Las Vegas, NV (US); Keith Rucker, Las Vegas, NV (US); John Edward Garofalo, Jr., Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,238

(22) Filed: Mar. 2, 2012

(65) Prior Publication Data

US 2012/0165089 A1 Jun. 28, 2012

Related U.S. Application Data

(63) Continuation of application No. 12/113,104, filed on Apr. 30, 2008, now Pat. No. 8,128,495.

(51) Int. Cl.
*A63F 13/00* (2006.01)

(52) U.S. Cl.
USPC .................. 463/31; 463/16; 463/17; 463/18; 463/19; 463/20; 463/24; 463/25; 463/27; 463/29; 463/30

(58) Field of Classification Search
USPC ........................ 463/10, 16–25, 40–43, 27–30
See application file for complete search history.

(56) References Cited

U.S. PATENT DOCUMENTS

| | | | | |
|---|---|---|---|---|
| 6,517,433 | B2 | 2/2003 | Loose et al. | |
| 7,510,475 | B2 * | 3/2009 | Loose et al. | 463/31 |
| 2002/0137217 | A1 | 9/2002 | Rowe | |
| 2008/0108401 | A1 * | 5/2008 | Baerlocher et al. | 463/12 |

FOREIGN PATENT DOCUMENTS

| | | | | |
|---|---|---|---|---|
| GB | 2 097 160 | A | 10/1982 | |
| GB | 2097160 | * | 10/1982 | G07F 17/34 |
| GB | 2097160 | A * | 10/1982 | |

* cited by examiner

*Primary Examiner* — Sunit Pandya
(74) *Attorney, Agent, or Firm* — Brook Quist; Marvin Hein

(57) ABSTRACT

Various methods for interacting with mechanical reels via a video screen are disclosed. In one embodiment, the method comprises providing a gaming machine having one or more mechanical reels positioned behind a video screen, wherein the video screen includes a touch screen and user interface for receiving user input. The mechanical reels spin and generate a game outcome, visible to the player through a video screen. A request is received, via the user interface, to rearrange the placement order of the mechanical reels, and the rearranged order of the mechanical reels is displayed on the video screen.

18 Claims, 6 Drawing Sheets

METHOD FOR INTERACTING A DISPLAY WITH MECHANICAL REELS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

This application is a continuation of U.S. patent application Ser. No. 12/113,104, filed Apr. 30, 2008, entitled METHOD FOR INTERACTING A DISPLAY WITH MECHANICAL REELS, the disclosure of which is herein incorporated by reference in its entirety. U.S. patent application Ser. No. 12/113,104 is related to co-pending U.S. patent application Ser. No. 12/113,112, concurrently filed on Apr. 30, 2008, entitled MECHANICAL REELS WITH INTERACTIVE DISPLAY.

BACKGROUND

Gaming machines have been developed having various features to capture and maintain player interest. Traditionally, gaming machines garner player interest by providing the player with the opportunity to win cash awards based upon a player's wager. Accordingly, various types of games or game features have been developed to provide players with the opportunity to win large sums of money for a small wager. For example, games may include one or more bonus games or the opportunity to win progressive jackpots in order to maintain player interest.

Additionally, over the years, gaming machines have grown in sophistication and features to maintain player interest. For example, the mechanical reels of traditional gaming machines have been replaced with video depictions of spinning reels. These video gaming machines provide a richer gaming experience for players by including graphics or animation as part of the game. Nevertheless, mechanical gaming machines continue to be successful even though there are physical limitations as to the features that may be provided on a mechanical gaming machine. Accordingly, there is a continuing need for mechanical slot machine variants to provide a player with enhanced excitement without departing from the original slot machine gaming concept.

SUMMARY

Briefly, and in general terms, various embodiments are directed to a method for enhancing a mechanical reel game. One embodiment provides a method for interacting with mechanical reels via a video screen. The method includes: providing a gaming machine having one or more mechanical reels positioned behind a video screen, the video screen including a touch screen and user interface for receiving user input; receiving a player bet; spinning the one or more mechanical reels; stopping the mechanical reels and producing a game outcome visible to the player through the video screen; receiving a request via the user interface to rearrange the placement order of the mechanical reels; displaying, on the video screen, the rearranged order of the mechanical reels; and presenting one or more virtual reels on the video screen for use in conjunction with the mechanical reels during a game.

Another embodiment provides a method for interacting with mechanical reels via a video screen. The method includes: providing a gaming machine having one or more mechanical reels positioned behind a video screen, the video screen including a touch screen and user interface for receiving user input; receiving a player bet; spinning the one or more mechanical reels; stopping the mechanical reels and producing a game outcome visible to the player through the video screen; receiving a request via the user interface to rearrange the placement of one or more symbols on at least one mechanical reel; displaying, on the video screen, the mechanical reels and the rearranged order of the symbols on the mechanical reels; and presenting one or more virtual reels on the video screen for use in conjunction with the mechanical reels during a game.

Other features and advantages will become apparent from the following detailed description, taken in conjunction with the accompanying drawings, which illustrate by way of example, the features of the various embodiments.

DETAILED DESCRIPTION

Figure 1:
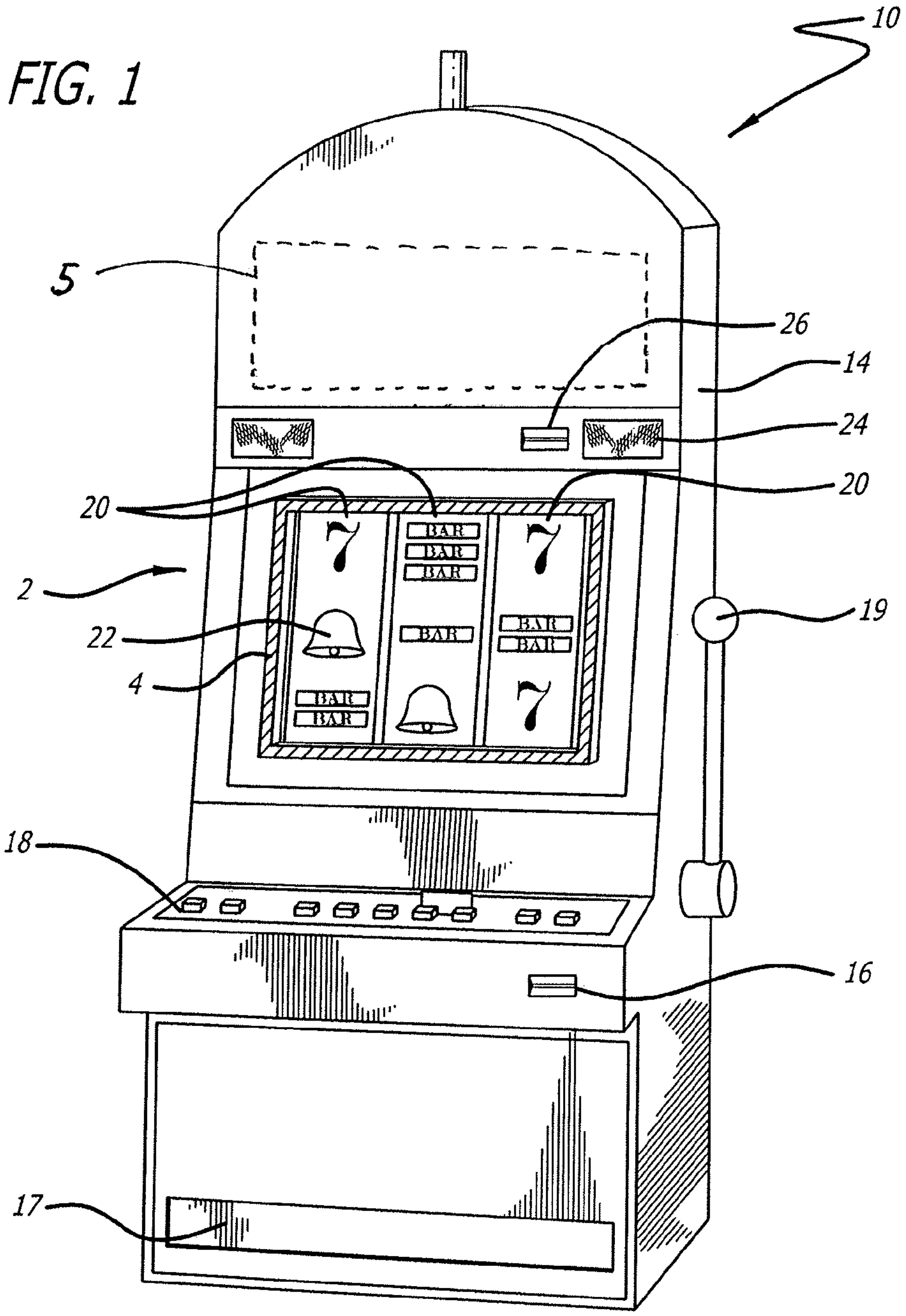
FIG. 1 is a perspective view of one embodiment of a mechanical gaming machine with an interactive video screen.

The present system and method are directed to enhancing a mechanical reel game. In particular, a video screen is positioned on a gaming cabinet so that one or more mechanical reels may be visible through the video screen. Additionally, the video screen is configured to interact with the mechanical reels to enhance game play.

Referring now to the drawings, wherein like reference numerals denote like or corresponding parts throughout the drawings and, more particularly to FIGS. 1-7, there are shown various embodiments of an enhanced mechanical gaming machine having an interactive display.

Referring to FIG. 1, an example embodiment of an enhanced gaming machine 10 is illustrated. The gaming machine 10 includes a display area 2. In one embodiment, the display area 2 is a viewing area that displays a plurality of mechanical reels 20 positioned within a gaming cabinet 16.

Three mechanical reels 20 are shown in the gaming machine 10 of FIG. 1, however, those skilled in the art will appreciate that any number of mechanical reels may be used in the gaming machine 10. The mechanical reels 20 include one or more indicia (or symbols) 22 on the outer surface of each mechanical reel 20.

In one embodiment, the mechanical reels 20 function as a slot-style game. The mechanical reels 20 spin about an axis and then stop to display a resulting combination of symbols in the display area 2. Generally, payouts are awarded based on the occurrence of a winning combination of symbols. The payout values awarded for the winning combinations will vary and are defined by the game creator. The payout schedule is typically either posted on the gaming machine or is available to the game player upon request.

Figure 2:
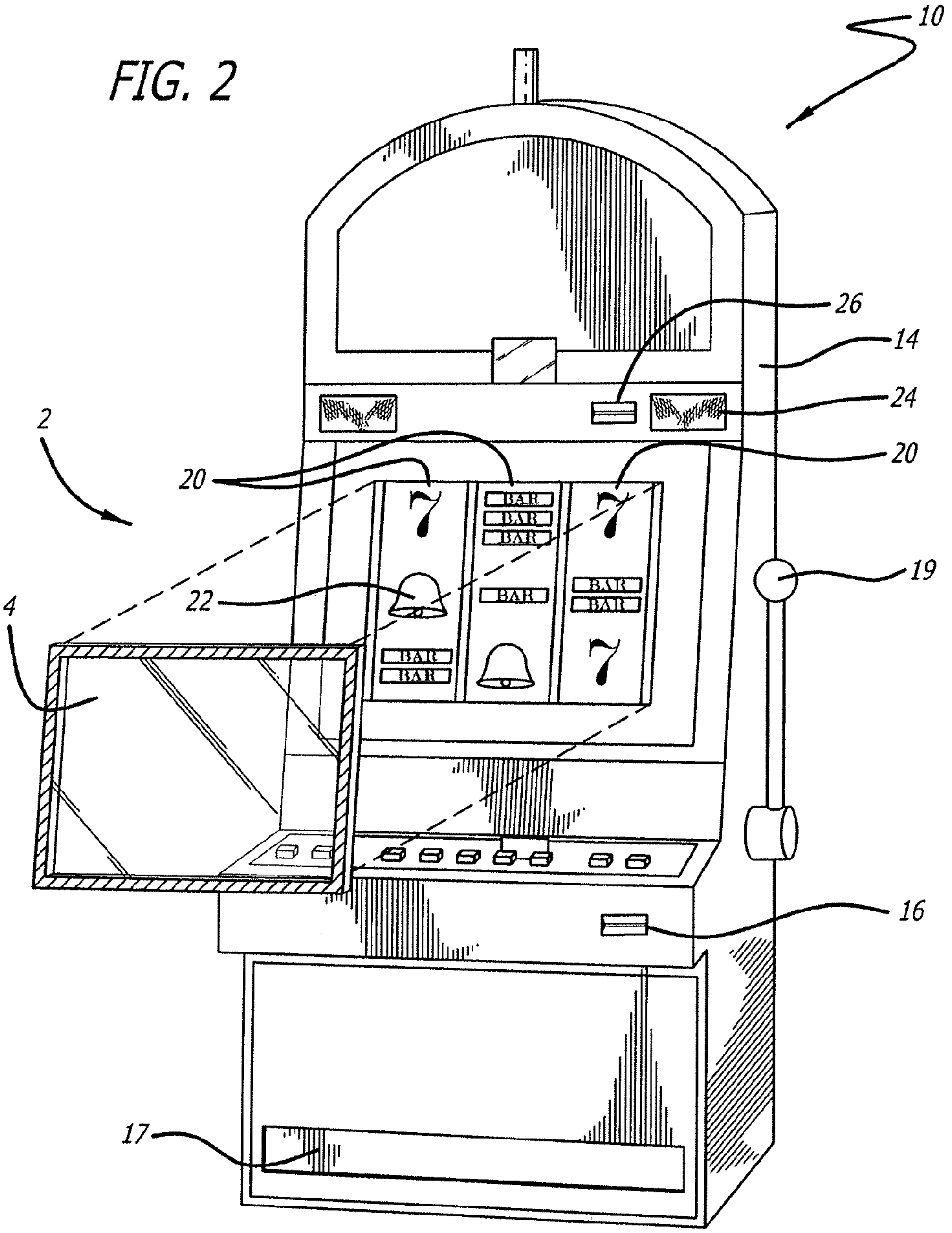
FIG. 2 is a schematic diagram of one embodiment of a mechanical gaming machine with an interactive video screen.

Referring to FIG. 2, the mechanical reels 20 of the gaming machine 10 are operatively coupled to stepper motors 30 which are responsible for spinning and stopping the mechanical reels 20. The stepper motors 30 of the gaming machine 10 are controlled and monitored by the reel control unit 28 (RCU 28). More specifically, the RCU 28 is responsible for determining a spin profile for each reel 20. In order to determine the appropriate spin profile, the RCU 28 calculates the distance between the current and final position of each mechanical reel 20. Based upon the spin distance and the desired spin duration of each reel, the RCU 28 then determines a spin profile for each mechanical reel 20. The spin profiles provide the stepper motors 30 with the number and duration of motor steps for each reel spin.

The RCU 28 is in communication with the game controller 22. The game controller 22 is a combination of hardware and software components that supports the game for a gaming machine 10 or a group of gaming machines 10. The game controller 22 is configured to support the game and may be responsible for the various functions of the gaming machine 10, such as, but not limited to, monitoring coin-in, coin-out, or credit meters, and awarding any prize(s) based upon the game result. The game controller 22 also generates the game outcome (i.e., the final stopping position for each reel) and is responsible for determining the desired spin duration for each reel 12. As those skilled in the art will appreciate, any of these functions may be separated into different or logical units and do not have to exist in a single controller unit.

In one embodiment, the game controller 32 includes a random number generator 34 that determines a game outcome, wherein the game outcome is a combination of indicia (or symbols). In alternate embodiments, the game controller 32 may use a pseudo-random number generator or a weighted random number generator to determine the game outcome. In yet another embodiment, the random number generator 34 (or pseudo-random number generator or weighted random number generator) is a separate component in communication with the game controller 32.

As shown in FIG. 2, the RCU 28 and the game controller 32 are separate components located within the gaming machine 10. As those skilled in the art will appreciate, the RCU 28 may be interconnected to the game controller 32 by a USB connection, a wireless network connection, or any other means for operatively coupling components together. In an alternate embodiment, the RCU 28 and the game controller 32 are integral components (not shown). In yet another embodiment, the RCU 28 and the game controller 32 may be located within the gaming machine 10, but the functions of the RCU or the game controller may be carried out at a central location (not shown), such as a network server, and communicated to each gaming machine by a local area network, wireless network, wide area network, or the like.

Referring back to FIG. 1, a video screen 4 is positioned in the display area 2 over the mechanical reels 20. In some embodiments, the video screen 4 is a LCD (liquid crystal display) in which the back panels have been removed thereby allowing the mechanical reels 20 to be visible through the video screen 4. In alternate embodiments, the video screen is an OLED (organic light-emitting diode) based display, an electroluminescent display (ELD), electronic paper display, or any other video screen display technology known or developed in the art. Those skilled in the art will appreciate that additional types of video screen devices may be used.

Figure 3:
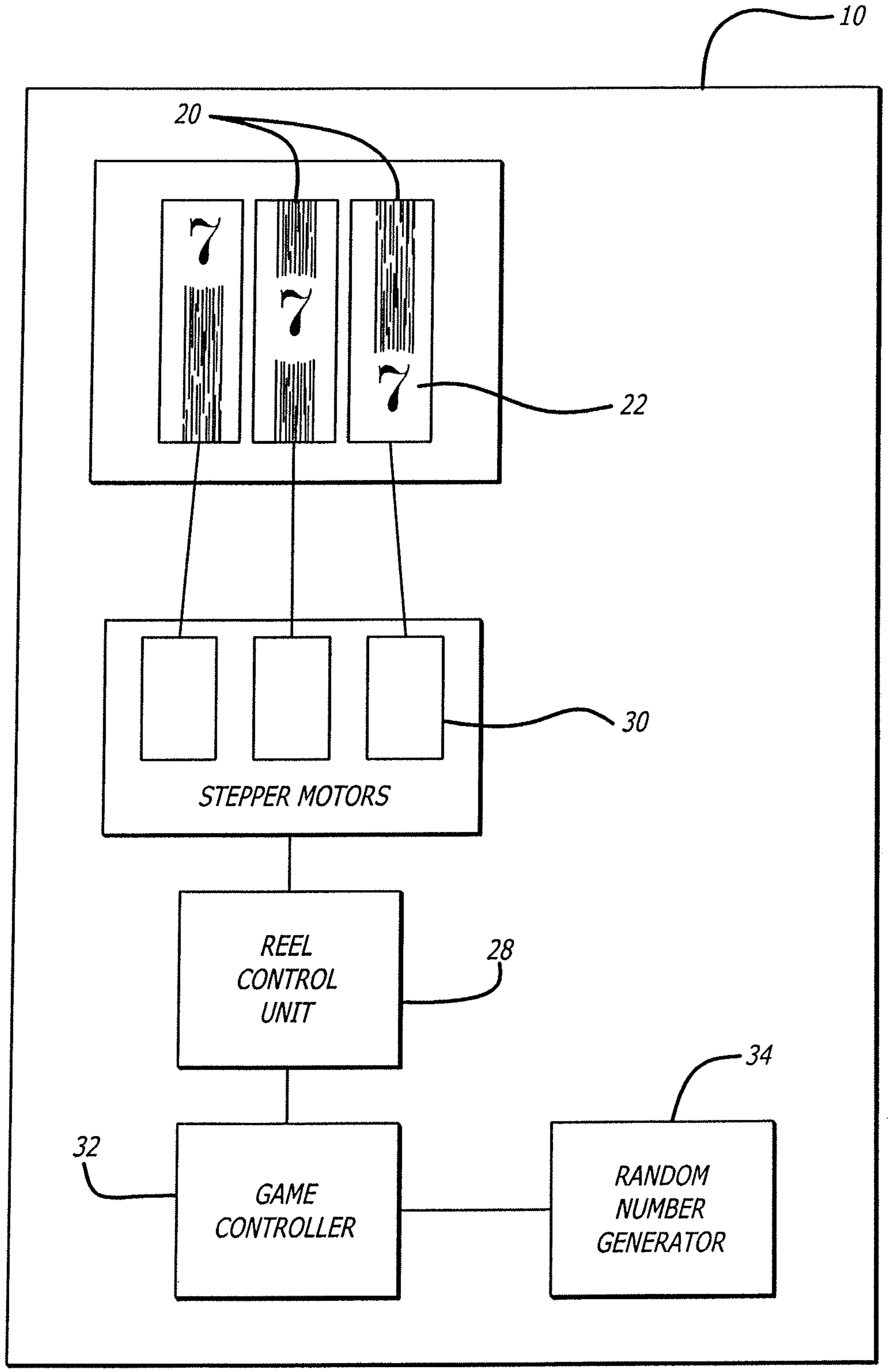
FIG. 3 is an alternate perspective of a mechanical gaming machine with an interactive video screen.

FIG. 3 provides an alternate perspective of the gaming machine and illustrates one example of the positioning of the video screen in relation to the mechanical reels 20. Additionally, the video screen 4 may be positioned in either a portrait or landscape orientation and utilizes standard or widescreen dimensions.

In various embodiments, the video screen 4 also includes a touch screen or touch glass system (not shown). The touch screen system enhances the player's ability to interact with the mechanical reels 20 via the video screen 4. For example, in various embodiments, the touch screen system serves as a user input mechanism and allows the user to enter requests and selections via the user interface provided on the touch screen.

Additionally, the gaming machine 10 may include additional types of input mechanisms. In one embodiment, the gaming machine 10 may include a plurality of player-activated buttons 18, which may be used for numerous functions such as, but not limited to, selecting a wager denomination, selecting a number of games to be played, selecting a wager amount per game, initiating a game, or cashing out money from the gaming machine 10. The buttons 18 function as input mechanisms and may include mechanical buttons, electromechanical buttons or touch screen buttons. Optionally, handle 19 may also serve as an input mechanism. More particularly, the handle 19 may be "pulled" by a player to initiate a game. Additionally, the various input mechanisms may be used to activate the mechanical reels 20 and/or the video screen 4.

In another embodiment, one input mechanism is a universal button module (not shown) that provides a dynamic button system adaptable for use with various games, as disclosed in U.S. application Ser. No. 11/106,212, entitled "Universal Button Module," filed Apr. 14, 2005 and U.S. application Ser. No. 11/223,364, entitled "Universal Button Module," filed Sep. 9, 2005, which are both hereby incorporated by reference. Additionally, other input devices, such as but not limited to, a touch pad, a track ball, a mouse, switches, and toggle switches, are included with the gaming machine to also accept player input.

In various embodiments, the touch screen system together with the video screen 4 provide a user interface for receiving user input. For example, as noted above, the touch screen system and the video screen 4 may provide simulated buttons that mimic the functions of the traditional button panel found on some gaming machines. In particular, the touch screen system and video screen 4 may provide a user interface that allows a game player to place a bet, enter the amount or wager, place a max bet, initiate a game, select a wager denomination, select a number of paylines to bet, spin the wheels, and/or to cash out from a game. Additionally, in another embodiment, the touch screen system together with the video screen 4 allows the game player to stop one or more mechanical wheels 20 from spinning once the game has started.

Figure 4:
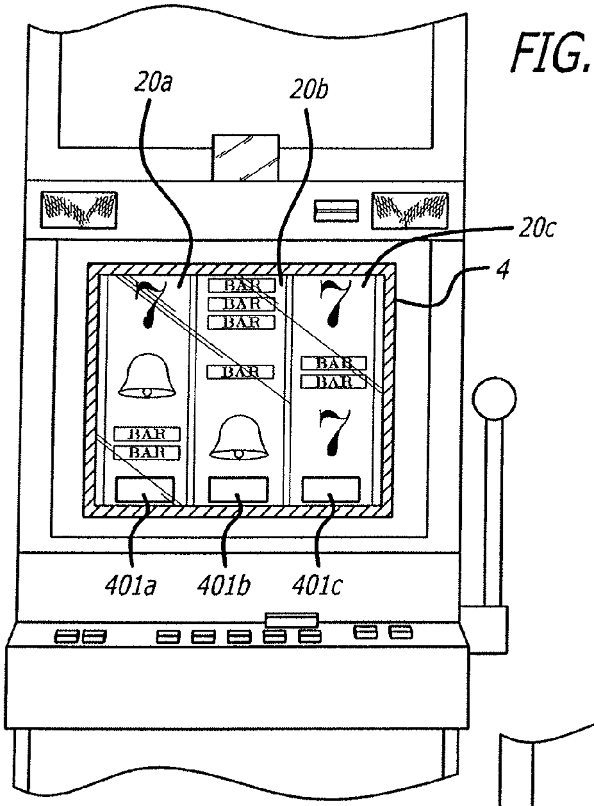
FIG. 4 is an example illustration of one embodiment of a mechanical gaming machine with an interactive video screen.

More particularly, in one embodiment, once the game player activates a game, the mechanical wheels 20 begin to spin. In one embodiment, the video screen 4 provides one or more buttons to stop the spinning wheels. Referring to FIG. 4, buttons 401*a*, 401*b* and 401*c* are provided on the video screen 4 and appear to be positioned under each of the mechanical reels 20*a*, 20*b* and 20*c*, respectively. As the mechanical reels

20 spin, the game player may select one or more of the buttons 401*a*, 401*b* and 401*c* to stop the spinning of the corresponding mechanical reel 20.

Figure 5:
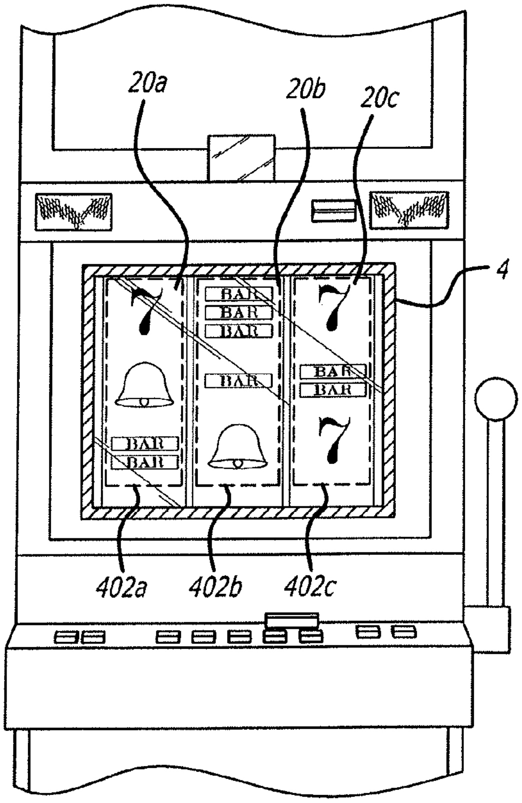
FIG. 5 is another example illustration of an embodiment of a mechanical gaming machine with an interactive video screen.

In an alternate embodiment, an area on the video screen 4 directly overlaying the mechanical reel may be "touched" in order to halt the spinning of a rotating reel. Referring to FIG. 5, activation areas 402*a*, 402*b* and 402*c* are configured to correspond to the mechanical reels 20*a*, 20*b* and 20*c*, respectively. For example, during game play, the game player may touch anywhere within the defined boundary of the activation area 402*a* to stop the spinning of mechanical reel 20*a*. Those skilled in the art will appreciate that activation areas 402*b* and 402*c* function in a similar manner.

In one example embodiment, once the mechanical reels 20 begin to spin, the game player may choose to stop the spinning of one or more of the mechanical reels 20, as discussed above. In one example, the game player selects the activation area 402*a*. The game player's touch on the activation area 402*a* is detected by the touch screen system, and a signal is sent to the game controller 32. The game controller 32 receives the request initiated by the game player to stop the mechanical reel 20*a*. The game controller 32 then sends a signal to the RCU28. The RCU28 receives the signal and sends a command to the stepper motor 30 to stop the mechanical reel 20*a*, and the mechanical reel 20 will then halt.

In an optional embodiment, the video screen 4, in combination with the touch screen system, allows a player to select one or more mechanical reels for game play. For example, in one embodiment, the gaming machine 10 includes five mechanical reels (not shown). The game player may select three of the five mechanical reels for game play. The mechanical reels are selected via the touch screen, wherein the game player merely touches the area of the video screen 4 overlaying the mechanical reels that the game player wishes to employ for the game. Optionally, in an alternate embodiment the game player selects, via the touch screen, those mechanical reels that the player does not want to use in the game.

Optionally, in some embodiments, the video screen 4 includes a filter or a screen to block out, or hide from the player's view, the mechanical reels that were not selected for game play. In an alternate embodiment, the selected reels are allowed to spin, and the non-selected reels are "grayed" out. In an optional embodiment, the game player may black out specific reel positions on one or more mechanical reels via the video screen 4.

Figure 6A:
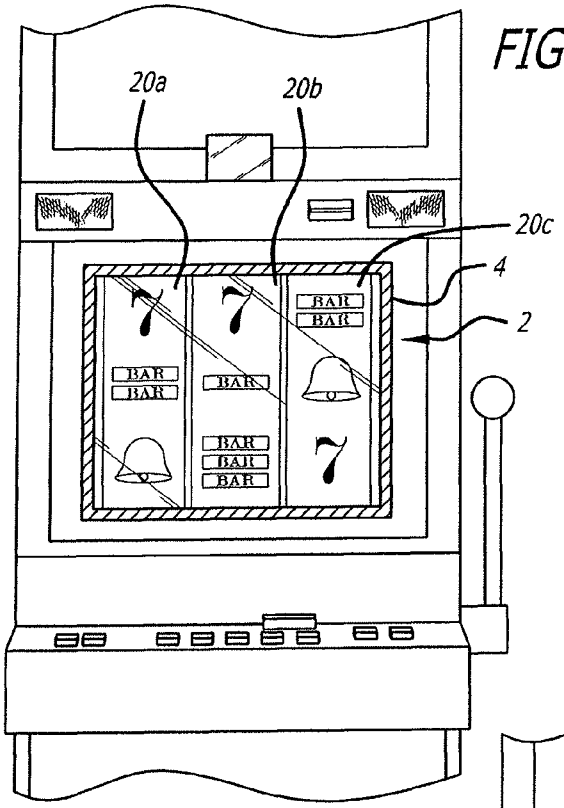
FIG. 6*a* is an example illustration of an interactive video screen and mechanical reel game.
Figure 6B:
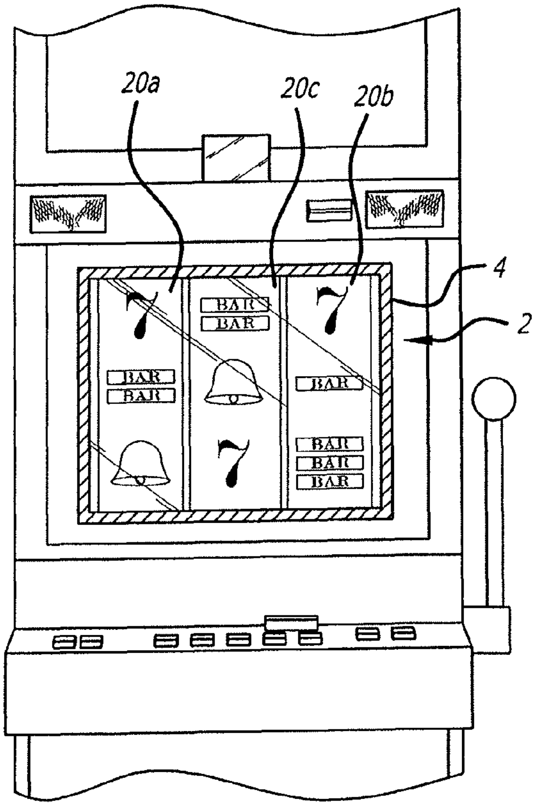
FIG. 6*b* is another example illustration of an interactive video screen and mechanical reel game.

In an alternate embodiment, the video screen 4 may be used to rearrange or reorder the mechanical reels. For example, in one scenario the game player places a bet, and the mechanical reels 20 spin. Once the spinning concludes, the game outcome is revealed to the player. In one embodiment, the game player may rearrange the placement order of the reels 20 via the user interface provided on the video screen 4. Rearranging the placement order of the mechanical reels 20 increases the game player's chances of achieving a winning combination and/or of achieving a winning combination with a higher payout. Referring to FIG. 6*a*, the resulting game outcome (i.e., the symbol combinations resulting from the mechanical reel spin) are shown in the display area 2. To earn a payout award, the game player may choose to swap the order of mechanical reel 20*b* and mechanical reel 20*c*, as shown in FIG. 2*b*. This "swap" yields the winning combination of "7=7" in the first payline. Note that prior to rearranging the mechanical reels 20*b* and 20*c*, the combination in the first payline was "7 7=" which is typically not a winning combination and is not awarded a payout.

Optionally, in another embodiment, the game player is allowed to rearrange, or reorder the placement of symbols on at least one of the mechanical reels 20. Similar to the above-described scenario, the touch screen user interface on the video screen 4 is used to facilitate the rearrangement.

In various embodiments, the video screen 4 provides graphics to further enhance the mechanical reel game. For example, the video screen 4 may also be used to note paylines, help screens and denominations. In one example embodiment, when a particular mechanic reel symbol is touched on the touch glass of the video screen 4, the associated pay table is displayed on the video screen 4. Additionally, the video screen 4 may display an associated paytable upon receiving a request from a game player. In another embodiment, a user may touch a symbol or bet tag to see a payline. The payline is then drawn across the video screen 4.

In another example, interactive help screens may be displayed on the video screen 4 over the mechanical reels 20. A game player may, via a user input mechanism, request interactive help screens. In one embodiment, the help screens may be requested via the user interface provided by the touch screen system on the video screen 4.

In another embodiment, a user may touch the video screen 4 to change the denominations of the mechanical reel game.

Additionally, in an optional embodiment, the video screen 4 also displays a volatility index graphic on the screen to display win amount results of the last twenty spins. Those skilled in the art will appreciate that any number of results may be displayed, for example the last 10, or last 100, and the like.

In other various embodiments, the video screen 4 may provide animated graphics to enhance the mechanical reel game. For example, the video screen may display animation sequences based on symbols from the mechanical reel 20. In particular, if a regular "7" on the mechanical reel 20 is part of a winning combination, then the "7" may be displayed on the video screen 4 as an animated "7" on fire. In some embodiments, during the animation presentation, the "7" on the mechanical reel may be blocked from view. In another example embodiment, after a winning combination occurs on the mechanical reels 20, a celebratory animation is displayed on the video screen 4.

The video screen 4, in some embodiments, may also cycle through text displayed above/over mechanical reels (e.g., "Game Name," "Bonus," "Winner," and the like). In another embodiment, the video screen 4 displays anticipation visuals or color changes on the screen around the border of mechanical reels 20 to indicate an impending win.

In optional embodiments, the video screen 4 provides virtual play lines and/or reels. For example, in one embodiment, the video screen 4 provides virtual positions to be used in conjunction with each mechanical reel 20. The virtual positions yield additional paylines. For example, in one embodiment, the video screen 4 provides two virtual positions for each mechanical reel 20. If each mechanical reel 20 has three display positions (top, middle, bottom), then the video screen 4 may also provide a virtual position above the top reel position and one below the bottom position, thereby creating two additional virtual positions for reach reel 20.

In another embodiment, the video screen 4 may provide one or more full virtual reels to be used in conjunction with the mechanical reels 20. For example, in one embodiment, the gaming machine includes three mechanical reels 20. The video screen 4 may provide two virtual reels, so that the game player perceives a total of five reels for the game.

In another embodiment, the video screen 4 changes the dressing on the "reel frame" to indicate a new game (e.g., moving up a level, advancing in an adventure-style game, multi-game play).

In one embodiment, the mechanical reels 20 provide a reel slot-style game, which functions as the primary game on the gaming machine 10, and the video screen 4 provides a separate bonus game. Optionally, when the bonus game is activated, the video screen 4 activates filters to block the mechanical reels 20 from view. In an alternate embodiment, the video screen 4 functions as the primary game on the gaming machine 10, and the mechanical reel game provides a separate bonus game. Optionally, when the primary game is presented on the video screen 4, filters are activated to block the mechanical reels 20 from view.

In another embodiment, the video screen 4 and the mechanical reels 20 function as separate gaming components. In one example embodiment, the mechanical reels 20 provide a slot-style game on the gaming machine 10. Immediately after the mechanical reels 20 stop spinning and provide a game result, the gaming machine 10 then proceeds to a video slot game, by providing a video style game on the video screen 4. During the presentation of the video game on the video screen 4, the mechanical reels 20 are not operating. In another embodiment, during the operation of the video game on the video screen 4, a filter blocks one or more of the mechanical reels 20 from view.

Alternately, in another embodiment, the gaming machine 10 first provides a video style game on the video screen 4. After conclusion of the game on the video screen 4, the gaming machine 10 then proceeds to operate as a mechanical slot machine by spinning the mechanical reels 20 and ceasing operation of the game on the video screen 4.

In another embodiment, the gaming machine 10 is an electronic gaming machine, and the primary games are provided on the video screen 4. However, the mechanical reels are provided for bonus features.

In various other embodiments, the video screen 4 may be used for bonus features. For example, in one embodiment, the video screen 4 presents a "pick-and-match" type bonus game, where the player can pick from onscreen grid to match three like icons. In another example, the video screen 4 presents a wild mystery multiplier on its screen as part of a bonus feature. Optionally, in another embodiment, the video screen 4 allows a game player to select a scatter symbol for use with the mechanical reels. In another example embodiment, the video screen 4 presents a special dynamic bonus payline, where the bonus payline displayed on the video screen 4 changes with each spin of mechanical reels 20.

In another embodiment, the gaming machine 10 includes a second video screen 5 placed on the gaming cabinet. In one embodiment, the video screen 5 also has a set of mechanical reels (not shown) located behind the video screen 5. The interaction between video and mechanical reels in both sets can indicate advancement in a bonus feature. For example, a winning combination on video reels presented on video screen 4 can reveal the mechanical reels 20 behind the video screen 4. Further, a winning combination on the mechanical reels 20 can reveal the video reels on the video screen 5. Further, a winning combination on the video screen 5 can reveal the mechanical reels behind the video screen 5.

Optionally, in another embodiment, the gaming machine includes one or more mechanical reels in a top box. The mechanical reels are hidden behind an opaque video screen until the mechanical reels are triggered for play. Alternately, in another embodiment, a mechanical wheel is placed in the top box. The wheel is hidden behind the video screen until the wheel is activated for play.

The gaming machine 10 may further include a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on the gaming machine 10. These input components include, but are not limited to, a card reader for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming devices.

Referring back to FIG. 1, the gaming machine 10 may include a card reader 26 for reading player tracking cards. Additionally, the card reader 26 may also read casino employee cards. Each time a card is inserted into the reader, it monitors and tracks player and employee activity.

In one embodiment, information obtained from the player tracking card may be used to enhance a game player's experience. For example, data such as the player's name may be retrieved from the player tracking card. The player's name may then be displayed on the video screen 4 to greet the player, thereby providing a more personalized gaming experience. Additionally, in another embodiment, the player who inserts a player tracking card may be given additional multipliers, which are displayed on the video screen 4. Further, the player may be given additional paylines or better paytables.

The main cabinet 16 of the gaming machine 10 is a self-standing unit that is generally rectangular in shape. In other embodiments, the cabinet (not shown) may be a slant-top, bar-top, or table-top style cabinet. However, any shaped cabinet may be used with any embodiment of the gaming machine 10 and sized for a player to be able to sit or stand while playing a game. Additionally, the cabinet 16 may be manufactured with reinforced steel or other rigid materials that are resistant to tampering and vandalism.

In one embodiment, the main cabinet 14 houses a game management unit (not shown) that includes a CPU, circuitry, and software for receiving signals from the player-activated buttons 18 and a handle 19, operating the games and transmitting signals to various components of the gaming machine 10 such as, but not limited to, the video screen 4, mechanical reels 20, and speakers 24.

The gaming machine 10 may also include one or more speakers 24. Various types of audio may be output to the speakers 24. The speakers 24 may be operatively connected to an amplifier (not shown). Optionally, various audio files for use with one or more audio features may be stored on the gaming machine 10.

In another embodiment, a seat (not shown) is operatively connected to the gaming machine 10. In one embodiment, the seat includes a vibration effect. In particular, the operatively-connected seat will vibrate during the pre-determined triggering events that occur during game play. Optionally, in another embodiment, the seat may have a heating effect. In particular, the seat may heat up or get warmer during game play. Additionally, in an optional embodiment, the game player may control the seat via the user interface provided on the video screen 4.

In another embodiment, lighting effects are used to increase player excitement. For example, during game play, lights (not shown) on the gaming machine 10 may flash dramatically to develop a sense of fanfare around a winning player. Additionally, other lighting effects capable for use during game play include, but are not limited to, pulsating light effects, backlighting, black lighting and colored lighting. In one embodiment, lights are strategically placed about the exterior of the gaming machine 10 (not shown). In this and other similar embodiments, the lights are selectively turned on and off to create various effects. For example, the lights may sequentially turn on and off to give the illusion of spinning. The lights may be conventionally controlled by circuitry tied to the gaming machine processor and software. Additionally, the lights may flash different colors to create a particular effect. For example, some lights may flash blue, while other lights flash red. It may further be appreciated that the lights may comprise light emitting diodes (LEDs) with red-green-blue or similar coloring which came be activated according to an algorithm or pattern to cause particular visual affects that generate excitement or entertainment to a player.

Figure 7:
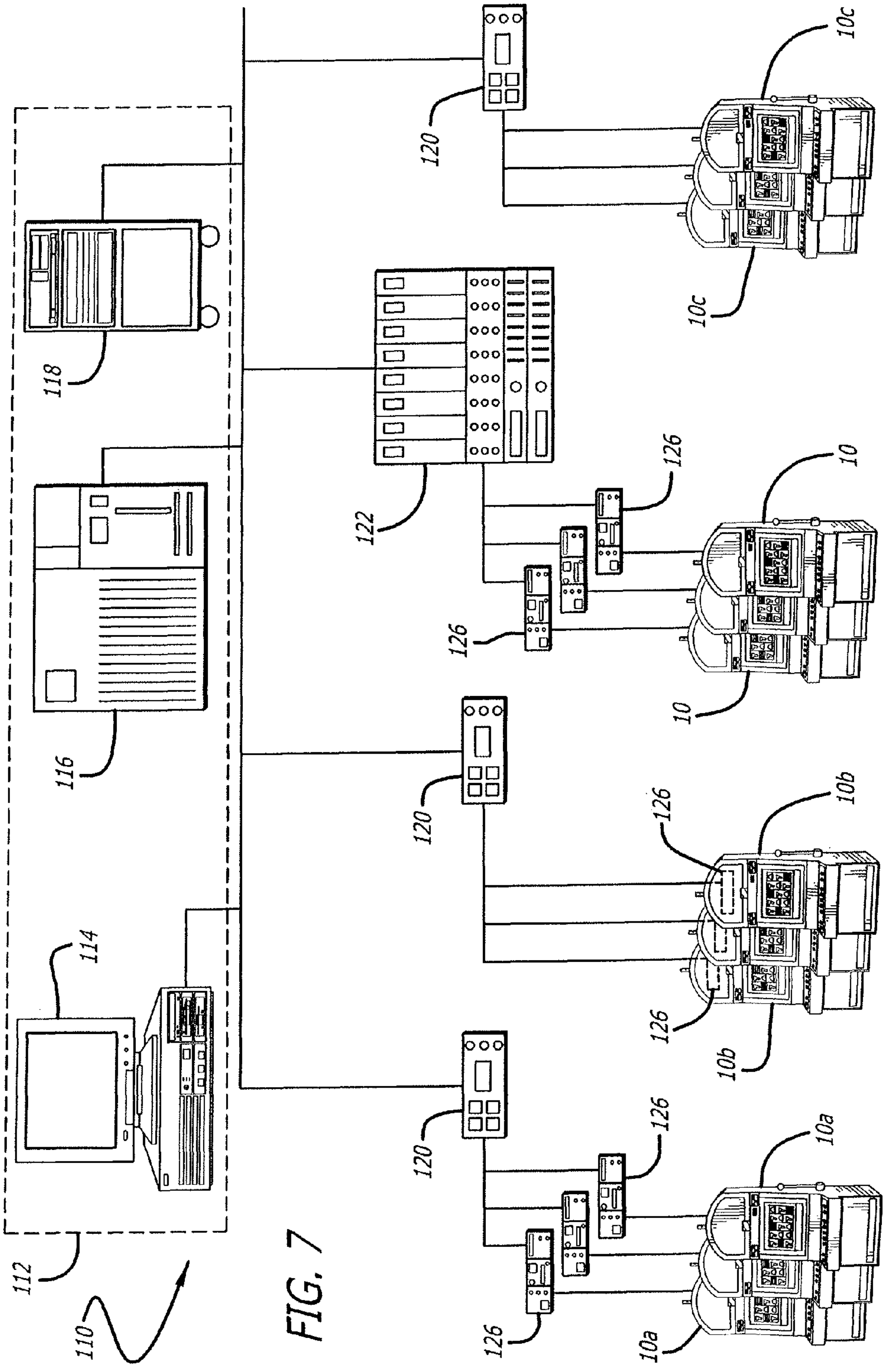
FIG. 7 is an schematic diagram of a casino gaming system.

Referring to FIG. 7, a casino gaming system 110 is illustrated. The casino gaming system 110 comprises one or more gaming machines 10 operatively connected via a network to a back end system 112. In one embodiment, data may be downloaded to the video screen 4 of one or more gaming machines dynamically. Alternately, data may be scheduled for download to one or more gaming machines. A configuration component may be used to configure the implementation of the downloading.

The gaming machines 10 are connected via a network to a network bridge 120, which is used for networking, routing and polling gaming machines. The network bridge 120 connects to a back end system 112. Optionally, the gaming machines 10 may connect to the network via a network rack 122, which provides for a fewer number of connections to the back end system 112. Both network bridge 120 and network rack 122 may be classified as middleware, and facilitate communications between the back end system 112 and the gaming machines 10. The network bridges 120 and network rack 122 may comprise data repositories for storing network performance data. Such performance data may be based on network traffic and other network-related information. Optionally, the network bridge 120 and the network rack 122 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The back end system 112 may be configured to comprise one or more servers. The type of server employed is generally determined by the platform and software requirements of the gaming system.

In one embodiment, as illustrated in FIG. 4, the back end system 112 is configured to include three servers: a slot floor controller 114, a casino management server 116 and a casino database 118. The slot floor controller 114 is a part of the player tracking system for gathering accounting, security and player specific information. The casino management server 116 and the casino database 118 work together to store and process information specific to both employees and players. Player-specific information includes, but is not limited to, passwords, biometric identification, player card identification, and biographic data. Additionally, employee specification information may include biographic data, biometric information, job level and rank, passwords, authorization codes and security clearance levels.

As discussed above, data may be downloaded from the back end system 112 to the video screen 4. Downloaded data includes, but is not limited to, gaming content, game themes, animation and graphic files for display on the video screen 4, sound files, and the like.

In one embodiment, the casino gaming system 110 supports tournament style play on one or more of the gaming machines 10. The video screen 4 informs players of payback percentage, tournament status, and the like. Additionally, the video screen 4 allows for the change of meter labels, or more particularly, for the change from credits to tournament points to points needed to reach the next progressive level, and the like.

In another embodiment of the casino gaming system 110, the paylines displayed on video screen 4 span across multiple adjacent gaming machines 10. Additionally, in another embodiment, bonus icons displayed on video screen 4 may also span across multiple adjacent gaming machines 10.

Optionally, the video screen 4 may also a player to select which gaming machines 10 to link in a tournament mode. In another embodiment, the video screen 4 displays the tournament leader. Additionally, the video screen 4 may further provide, via a user interface, an option for extending time for the tournament mode.

One of ordinary skill in the art will appreciate that not all disclosed embodiments have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for interacting with mechanical reels via a video screen, the method comprising:

providing a gaming machine having one or more mechanical reels positioned behind a video screen, the video screen including a touch screen and a user interface for receiving user input;

receiving a player bet;

spinning the one or more mechanical reels, and during the spinning of the mechanical reels, receiving a signal from the user interface to stop spinning one identified particular mechanical reel while at least one mechanical reel continues to spin;

stopping the mechanical reels and producing a game outcome visible to the player through the video screen;

receiving a request via the user interface to rearrange the placement order of the mechanical reels;

displaying, on the video screen, the rearranged order of the mechanical reels;

reordering selected symbols of a selected mechanical reel such that a first selected symbol of the selected mechanical reel replaces a second selected symbol of the selected mechanical reel and the second selected symbol replaces the first selected symbol; and presenting one or more virtual reels on the video screen for use in conjunction with the mechanical reels during a game.

2. The method of claim 1, further comprising, during the spinning of the mechanical reels, receiving a signal from the user interface to stop spinning at least one identified, particular mechanical reel.

3. The method of claim 2, further comprising sending a signal to a reel control unit to stop spinning the identified particular mechanical reel.

4. The method of claim 2, further comprising sending a signal to a stepper motor to stop spinning the identified particular mechanical reel.

5. The method of claim 1, further comprising receiving a request via the user interface to rearrange the order of the symbols on at least one of the mechanical reels.

6. The method of claim 5, further comprising displaying the mechanical reels and the resulting rearrangement of the symbols on the video screen.

7. The method of claim 1, further comprising receiving user input to rearrange a sequential placement order of the reels on the video screen without removing any reels.

8. The method of claim 1, further comprising generating one or more paylines on the video screen for use in conjunction with the mechanical reels during a game.

9. The method of claim 1, further comprising downloading data from a back end system to the gaming machine, wherein the data is for use by the video screen.

10. A method for interacting with mechanical reels via a video screen, the method comprising:

providing a gaming machine having one or more mechanical reels positioned behind a video screen, the video screen including a touch screen and user interface for receiving user input;

receiving a player bet;

spinning the one or more mechanical reels, and during the spinning of the mechanical reels, receiving a signal from the user interface to stop spinning one identified particular mechanical reel while at least one mechanical reel continues to spin;

stopping the mechanical reels and producing a game outcome visible to the player through the video screen;

receiving a request via the user interface to rearrange the placement of one or more symbols on at least one mechanical reel;

displaying, on the video screen, the mechanical reels and the rearranged order of the symbols on the mechanical reels;

reordering selected symbols of a selected mechanical reel such that a first selected symbol of the selected mechanical reel replaces a second selected symbol of the selected mechanical reel and the second selected symbol replaces the first selected symbol; and presenting one or more virtual reels on the video screen for use in conjunction with the mechanical reels during a game.

11. The method of claim 10, further comprising, during the spinning of the mechanical reels, receiving a signal from the user interface to stop spinning at least one identified, particular mechanical reel.

12. The method of claim 10, further comprising sending a signal to a reel control unit to stop spinning the identified particular mechanical reel.

13. The method of claim 10, further comprising sending a signal to a stepper motor to stop spinning the identified particular mechanical reel.

14. The method of claim 10, further comprising receiving a request via the user interface to rearrange the order of the mechanical reels.

15. The method of claim 10, further comprising presenting the rearrangement of the mechanical reels on the video screen.

16. The method of claim 10, further comprising receiving user input to rearrange a sequential placement order of the reels on the video screen without removing any reels.

17. The method of claim 10, further comprising generating one or more paylines on the video screen for use in conjunction with the mechanical reels during a game.

18. The method of claim 10, further comprising downloading data from a back end system to the gaming machine, wherein the data is for use by the video screen.

* * * * *